US008403076B2

(12) United States Patent
Iwakami

(10) Patent No.: US 8,403,076 B2
(45) Date of Patent: Mar. 26, 2013

(54) POWER TOOL

(75) Inventor: Junichi Iwakami, Anjo (JP)

(73) Assignee: Makita Corporation, Anjo (JP)

( * ) Notice: Subject to any disclaimer, the term of this patent is extended or adjusted under 35 U.S.C. 154(b) by 89 days.

(21) Appl. No.: 12/457,488

(22) Filed: Jun. 12, 2009

(65) Prior Publication Data

US 2009/0314507 A1 Dec. 24, 2009

(30) Foreign Application Priority Data

Jun. 19, 2008 (JP) ................................. 2008-161036

(51) Int. Cl.

| | |
|---|---|
| ***B25D 17/11*** | (2006.01) |
| ***B25D 17/24*** | (2006.01) |
| ***B25D 9/00*** | (2006.01) |
| ***B25D 11/00*** | (2006.01) |
| ***B25D 13/00*** | (2006.01) |
| ***B25D 16/00*** | (2006.01) |
| ***B23B 45/16*** | (2006.01) |

(52) U.S. Cl. ..................................... 173/162.1; 173/210

(58) Field of Classification Search ....... 173/161–162.2, 173/210, 131

See application file for complete search history.

(56) References Cited

U.S. PATENT DOCUMENTS 2,431,316 A * 11/1947 Dudley et al. ................. 318/434
2,592,649 A * 4/1952 Brackett ....................... 173/170
3,727,261 A * 4/1973 Levine ....................... 15/104.33
4,066,133 A * 1/1978 Voss ............................. 173/182
4,448,098 A * 5/1984 Totsu .............................. 81/467
4,667,749 A * 5/1987 Keller ........................ 173/162.2
4,684,774 A * 8/1987 Dibbern et al. ............... 200/275
4,800,965 A * 1/1989 Keller ........................ 173/162.2
5,522,466 A * 6/1996 Harada et al. .............. 173/162.2
5,525,889 A * 6/1996 Chan et al. .................... 173/217
5,692,574 A * 12/1997 Terada ....................... 173/162.2
5,697,456 A * 12/1997 Radle et al. ................ 173/162.2
5,792,165 A * 8/1998 Klieman et al. .............. 606/170
5,817,119 A * 10/1998 Klieman et al. .............. 606/174
6,102,022 A * 8/2000 Schave ....................... 125/13.01
6,148,930 A * 11/2000 Berger et al. .............. 173/162.2
6,380,502 B1 * 4/2002 Hirschburger et al. ....... 200/548
6,479,918 B1 * 11/2002 Burger et al. ................. 310/241
6,550,545 B1 * 4/2003 Manschitz et al. .............. 173/48

(Continued)

FOREIGN PATENT DOCUMENTS

GB 2 297 514 A 8/1996
JP A-08-216061 8/1996

(Continued)

OTHER PUBLICATIONS

European Search Report of corresponding European Patent Application No. 09 00 7883 issued Oct. 29, 2009.

*Primary Examiner* — Robert Long
(74) *Attorney, Agent, or Firm* — Oliff & Berridge PLC

(57) ABSTRACT

A power tool includes a grip, a connecting part, an elastic element, an electrical switch and an operating member. The connecting part connects the grip to the power tool body. The elastic element is disposed between the connecting part and the power tool body. The operating member is switched by a user between an energizing position and a de-energizing position. The operating member is retained in the position to which it is switched. The operating member is disposed in the connecting part in such a manner as to be slidable in a direction transverse to the longitudinal direction of the power tool body and to the extending direction of the grip.

8 Claims, 4 Drawing Sheets

U.S. PATENT DOCUMENTS

| | | | | |
|---|---|---|---|---|
| 7,174,972 | B2 * | 2/2007 | Kristen et al. | 173/171 |
| 7,249,862 | B2 * | 7/2007 | Shirane | 362/119 |
| 7,320,368 | B2 * | 1/2008 | Watanabe | 173/48 |
| 7,322,427 | B2 * | 1/2008 | Shimma et al. | 173/48 |
| 7,355,314 | B2 * | 4/2008 | Riedl et al. | 310/239 |
| 7,397,153 | B2 * | 7/2008 | Buck et al. | 310/50 |
| 7,401,663 | B2 * | 7/2008 | Craven et al. | 173/217 |
| 7,497,272 | B2 * | 3/2009 | Strasser et al. | 173/48 |
| 7,500,527 | B2 * | 3/2009 | Fischer et al. | 173/162.2 |
| 7,523,790 | B2 * | 4/2009 | Arakawa et al. | 173/162.2 |
| 7,743,683 | B2 * | 6/2010 | Dayton et al. | 81/52 |
| 7,861,799 | B2 * | 1/2011 | Iwakami et al. | 173/201 |
| 7,921,935 | B2 * | 4/2011 | Engelfried et al. | 173/162.2 |
| 7,971,656 | B2 * | 7/2011 | Engelfried et al. | 173/162.2 |
| 7,987,921 | B2 * | 8/2011 | Hahn | 173/162.1 |
| 8,061,438 | B2 * | 11/2011 | Schmid et al. | 173/162.2 |
| 8,162,075 | B2 * | 4/2012 | Roberts et al. | 173/162.2 |
| 2003/0037937 | A1 * | 2/2003 | Frauhammer et al. | 173/48 |
| 2005/0087353 | A1 * | 4/2005 | Oki et al. | 173/162.2 |
| 2006/0011361 | A1 * | 1/2006 | Shimma et al. | 173/48 |
| 2006/0060365 | A1 * | 3/2006 | Kunz | 173/48 |
| 2006/0117581 | A1 * | 6/2006 | Oki et al. | 30/392 |
| 2006/0185867 | A1 * | 8/2006 | Frauhammer et al. | 173/162.1 |
| 2006/0219418 | A1 * | 10/2006 | Arakawa et al. | 173/162.2 |
| 2008/0017396 | A1 * | 1/2008 | Kristen et al. | 173/162.2 |
| 2008/0189870 | A1 * | 8/2008 | Dayton et al. | 7/167 |
| 2008/0250570 | A1 * | 10/2008 | Dayton et al. | 7/170 |
| 2009/0049651 | A1 * | 2/2009 | Roberts et al. | 16/446 |
| 2009/0056965 | A1 * | 3/2009 | Moessnang | 173/18 |
| 2009/0113728 | A1 * | 5/2009 | Oki et al. | 30/392 |
| 2009/0223691 | A1 * | 9/2009 | Ikuta et al. | 173/117 |
| 2009/0236110 | A1 * | 9/2009 | Iwakami et al. | 173/122 |
| 2009/0294144 | A1 * | 12/2009 | Frauhammer et al. | 173/162.2 |
| 2009/0314507 | A1 * | 12/2009 | Iwakami | 173/162.2 |
| 2010/0012339 | A1 * | 1/2010 | Hahn et al. | 173/162.2 |
| 2010/0018734 | A1 * | 1/2010 | Frauhammer et al. | 173/171 |
| 2010/0132969 | A1 * | 6/2010 | Bito et al. | 173/162.2 |
| 2010/0155094 | A1 * | 6/2010 | Ikuta et al. | 173/162.1 |
| 2010/0193209 | A1 * | 8/2010 | Schadow et al. | 173/162.2 |
| 2010/0236800 | A1 * | 9/2010 | Watanabe et al. | 173/20 |
| 2010/0236801 | A1 * | 9/2010 | Furusawa et al. | 173/47 |
| 2011/0011608 | A1 * | 1/2011 | Saur | 173/162.2 |
| 2011/0030983 | A1 * | 2/2011 | Kakiuchi et al. | 173/46 |

FOREIGN PATENT DOCUMENTS

| | | |
|---|---|---|
| JP | A-2005-219195 | 8/2005 |
| WO | WO 2006120092 A1 * | 11/2006 |

* cited by examiner

POWER TOOL

BACKGROUND OF THE INVENTION

1. Field of the Invention

The present invention relates to a hand-held power tool which performs a predetermined operation on a workpiece by linearly driving a tool bit.

2. Description of the Related Art

In order to control a motor within a hand-held power tool between an energized state and a de-energized state, both a slide type operating member and a trigger type operating member are known. An example of the slide type is disclosed, for example, in Japanese non-examined laid-open Patent Publication No. H08-216061, and an example of the trigger type is disclosed, for example, in Japanese non-examined laid-open Patent Publication No. 2005-219195.

The slide type is applied to a hammer in which a tool bit performs only striking movement. The slide member operated by a user and an electrical switch are typically disposed in a connecting part between a power tool body and a handgrip. In the slide type, after the slide member is slid to a position in which the electrical switch is placed in an on position, the slide member is retained in that position to which it is slid even if it is released. Therefore, ease of operation can be enhanced in holding the handgrip and operating the power tool to perform a predetermined operation.

The trigger type is applied to a hammer drill in which a tool bit performs striking movement and rotation. In such a hammer drill, both a trigger and an electrical switch are disposed in a grip part of a handgrip. The electrical switch is placed on an on position when the trigger is depressed, and it is automatically returned to the off position when the trigger is released. In a construction using the trigger type, a vibration-proof structure using an elastic element is provided in a connecting part which connects the handgrip and the power tool body, so that vibration of the handgrip can be reduced and thus load on the user can be alleviated.

With a construction in which the slide type is applied as a manner of operating the electrical switch, as described above, ease of operation can be enhanced, but the handgrip does not have a vibration-proof structure so that a load on the user is increased. On the other hand, with a construction of the trigger type, the handgrip can have a vibration-proof structure, but the user has to maintain the depressing operation of the trigger, so that ease of operation is decreased.

SUMMARY OF THE INVENTION

It is, accordingly, an object of the invention to provide a hand-held power tool in which both increased ease of operation and vibration-proof structure of a grip are given.

Above-described object can be achieved by the claimed invention. The representative hand-held power tool according to the invention performs a predetermined operation on a workpiece by a tool bit disposed in a tip end region of a power tool body and driven by a motor. The power tool includes a grip, a connecting part, an elastic element, an electrical switch and an operating member. The grip is arranged on an opposite rear side of the power tool body from the tool bit and extends in a direction transverse to a longitudinal direction of the power tool body. The connecting part connects the grip to the power tool body at one end side in the extending direction of the grip. The elastic element is disposed between the connecting part and the power tool body and serves to reduce transmission of vibration from the power tool body to the grip. The electrical switch can switch the motor between an energized state and a de-energized state. The operating member is switched by a user between an energizing position in which the electrical switch switches the motor to the energized state and a de-energizing position in which the electrical switch switches the motor to the de-energized state. Further, the operating member is retained in the position to which it is switched. Moreover, the operating member is disposed in the connecting part in such a manner as to be slidable in a direction transverse to the longitudinal direction of the power tool body and to the extending direction of the grip.

The "hand-held power tool" in this invention typically represents a hammer which performs a hammering operation on a workpiece by striking movement of a tool bit in its axial direction, but it is not limited to a hammer. It may also include a hammer drill which performs a hammer drill operation on a workpiece by striking movement and rotation of a tool bit, and a cutting power tool, such as a reciprocating saw and a jig saw, which performs a cutting operation on a workpiece by reciprocating movement of a blade. Further, the "elastic element" in this invention typically represents a rubber or a spring. Further, typically, the "connecting part" is integrally formed with the grip, but it may be formed separately and joined to the grip.

According to the preferred embodiment of the hand-held power tool in this invention, the elastic element is disposed between the connecting part and the power tool body, so that transmission of vibration from the power tool body to the grip via the connecting part can be reduced by the elastic element. In this manner, the vibration-proof grip can be realized. Further, as a means for operating the electrical switch, the slide-type operating member which is retained in the position to which it is slid is provided in the connecting part. With this construction, the user can switch the motor to the energized state by sliding the operating member and then the user can release the operating member in that energized state. Therefore, the user does not have to retain the operating member by the finger in the position to which it is slid. Thus, ease of operation can be enhanced in holding the grip and operating the power tool to perform an operation. Specifically, according to this embodiment, a power tool can be realized which has a vibration-proof grip and provides increased ease of operation in performing an operation.

According to a further embodiment of the hand-held power tool in this invention, the grip is hollow and the electrical switch is disposed in a hollow part of the grip. According to this invention, with the construction in which the electrical switch is disposed in the hollow part of the grip, effective use can be made of the space of the hollow part, and the electrical switch can be protected against vibration. Further, the electrical switch is located away from a source of heat generation on the power tool body side or isolated from heat which is generated when a drive unit for driving the tool bit is driven, the electrical switch can be protected against an adverse effect which may be caused by the heat generation.

According to a further embodiment of the hand-held power tool in this invention, the grip is connected to the power tool body at the other end side in the extending direction of the grip in such a manner as to be rotatable on a pivot with respect to the power tool body in the longitudinal direction of the power tool body. With such a construction, the elastic element is located remote from the pivot, and thus vibration absorption of the elastic element is performed at a location in which the amplitude of vibration is large, so that vibration can be efficiently absorbed. Further, with the construction in which the grip is connected to the power tool body via the pivot, undesired "wobbling" between the grip and the power tool body in any direction other than the direction of rotation on the pivot can be prevented in a rational manner.

According to a further embodiment of the hand-held power tool in this invention, a motor control unit is disposed on the power tool body side, and the electrical switch and the motor control unit are connected by a wire running to the power tool body side through the grip and a connecting part of the grip on the other end side in the extending direction of the grip. With such a construction, the electrical switch on the grip side and the motor control unit on the power tool body side can be connected in a rational manner. Other objects, features and advantages of the present invention will be readily understood after reading the following detailed description together with the accompanying drawings and the claims.

DETAILED DESCRIPTION OF THE INVENTION

Each of the additional features and method steps disclosed above and below may be utilized separately or in conjunction with other features and method steps to provide and manufacture improved power tools and method for using such power tools and devices utilized therein. Representative examples of the present invention, which examples utilized many of these additional features and method steps in conjunction, will now be described in detail with reference to the drawings. This detailed description is merely intended to teach a person skilled in the art further details for practicing preferred aspects of the present teachings and is not intended to limit the scope of the invention. Only the claims define the scope of the claimed invention. Therefore, combinations of features and steps disclosed within the following detailed description may not be necessary to practice the invention in the broadest sense, and are instead taught merely to particularly describe some representative examples of the invention, which detailed description will now be given with reference to the accompanying drawings.

Figure 1:
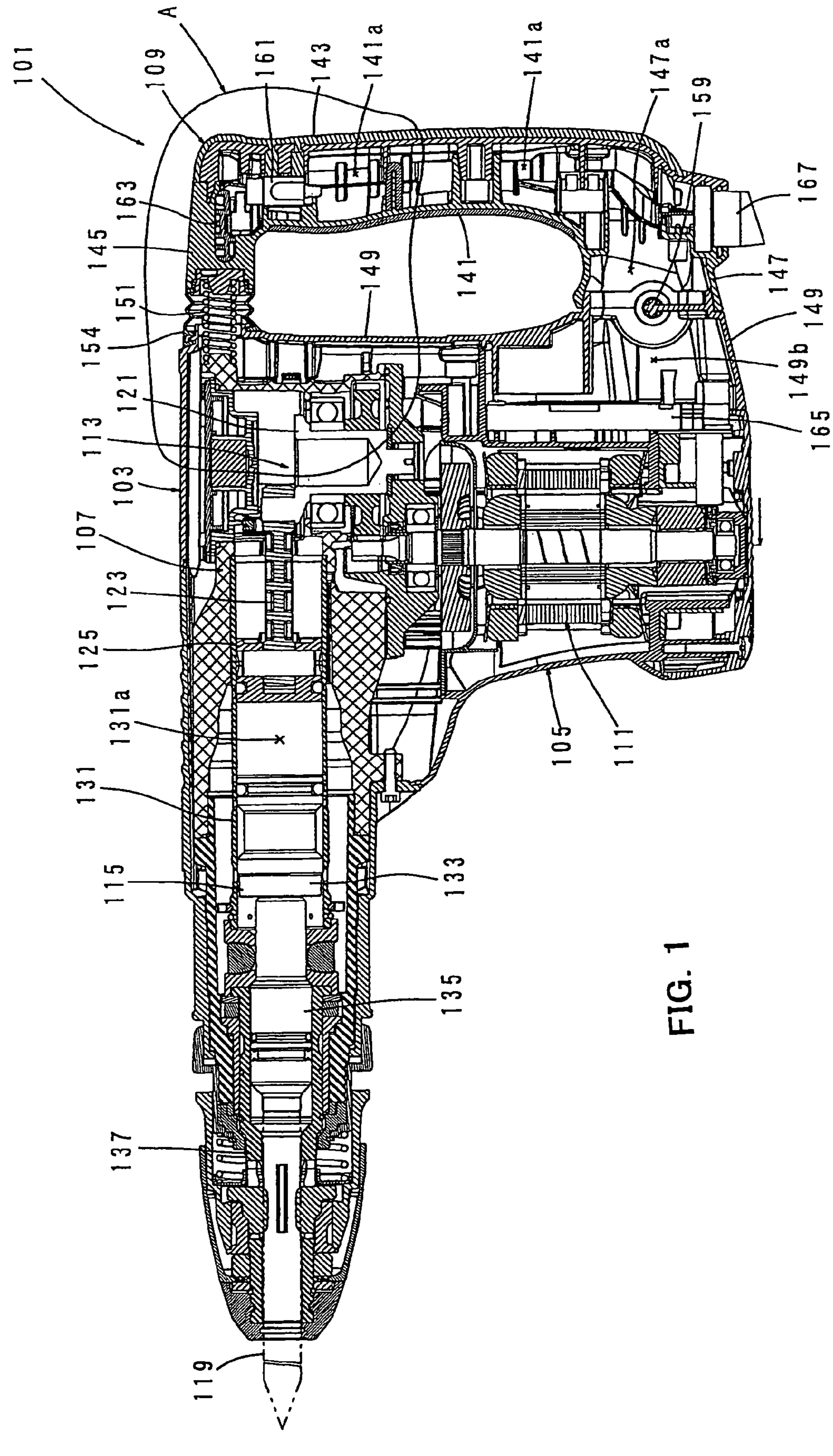
FIG. 1 is a sectional side view showing an entire structure of an electric hammer according to an embodiment of the present invention.
Figure 2:
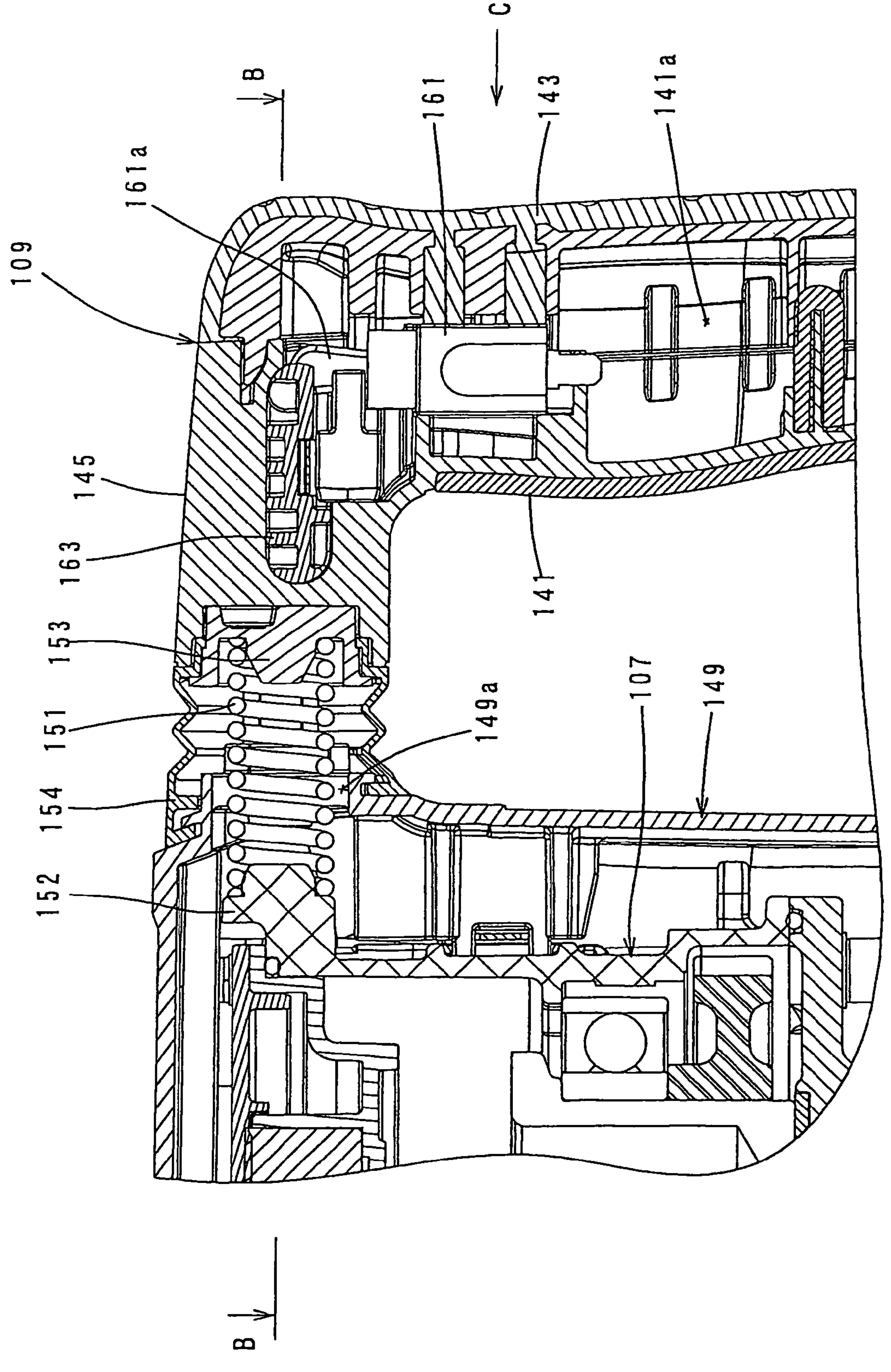
FIG. 2 is an enlarged view of part A in FIG. 1.
Figure 3:
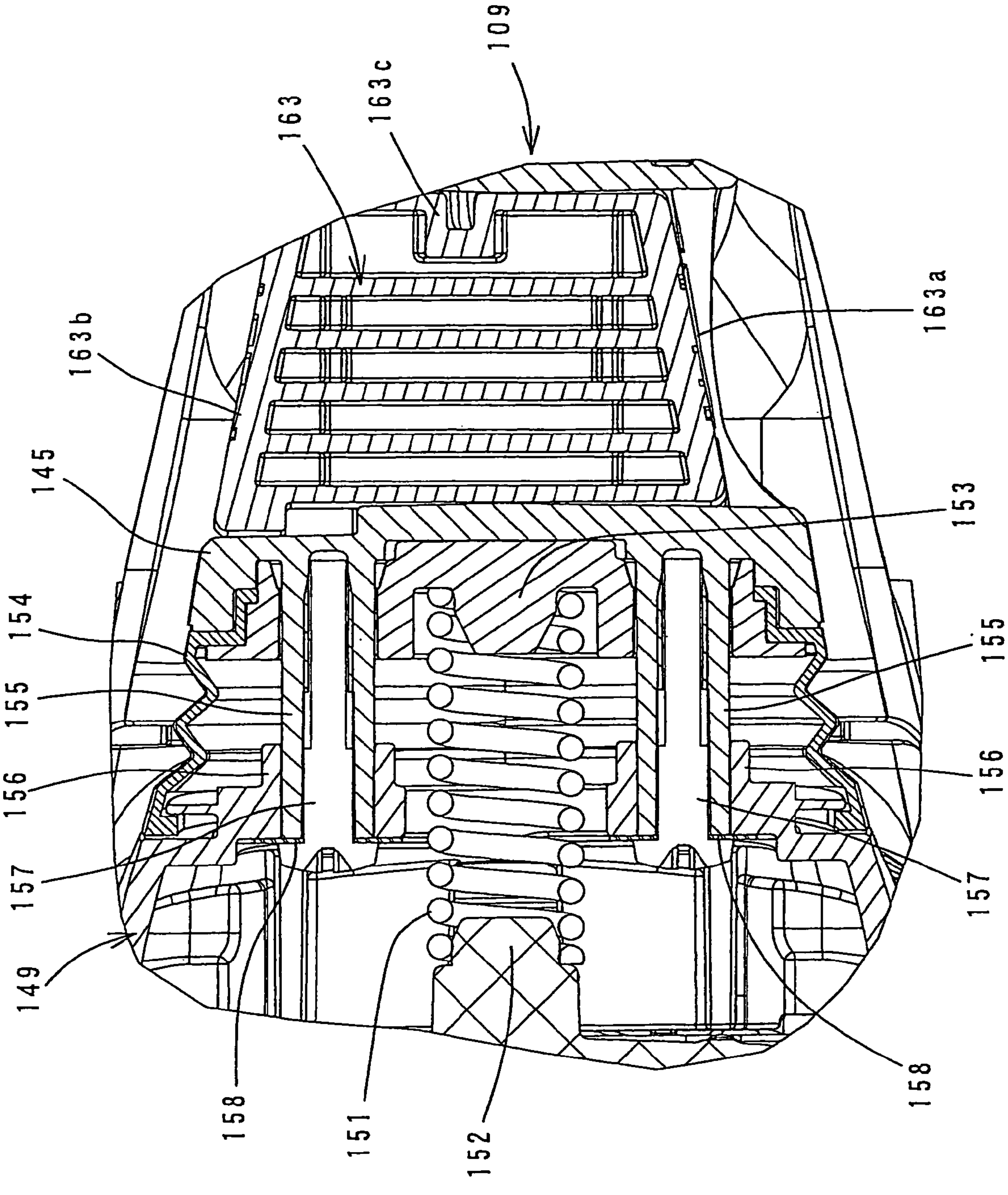
FIG. 3 is a sectional view taken along line B-B in FIG. 2.
Figure 4:
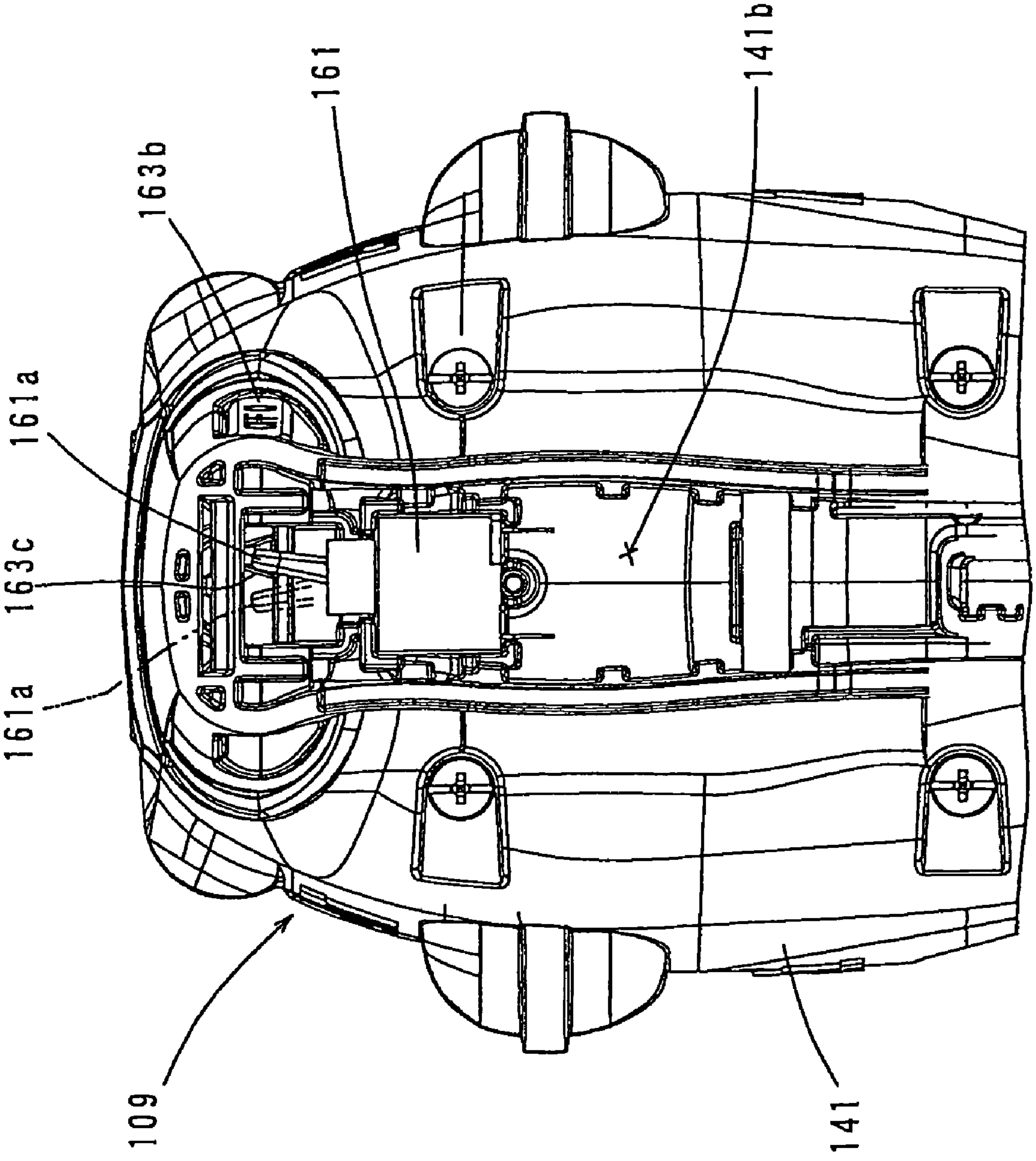
FIG. 4 is a sectional view taken from the direction of the arrow C in FIG. 2.

A representative embodiment of the present invention is now described with reference to the drawings. In this embodiment, an electric hammer is explained as a representative example of a hand-held power tool according to the present invention. FIG. 1 shows an entire structure of the electric hammer, and FIG. 2 is an enlarged view of part A in FIG. 1. FIG. 3 is a sectional view taken along line B-B in FIG. 2, and FIG. 4 is a view taken from the direction of the arrow C in FIG. 2, and not showing a grip cover removed from the grip body.

As shown in FIG. 1, the electric hammer 101 according to this embodiment mainly includes a body 103 that forms an outer shell of the hammer 101, a hammer bit 119 detachably coupled to the tip end region (on the left side as viewed in FIG. 1) of the body 103 via a tool holder 137, and a handgrip 109 connected to the body 103 on the side opposite to the hammer bit 119 and designed to be held by a user. The body 103, the hammer bit 119 and the handgrip 109 are features that correspond to the "power tool body", the "tool bit" and the "grip", respectively, according to the present invention. The hammer bit 119 is held by the tool holder 137 such that it is allowed to reciprocate with respect to the tool holder in its axial direction and prevented from rotating with respect to the tool holder in its circumferential direction. In the present embodiment, for the sake of convenience of explanation, the side of the hammer bit 119 is taken as the front side and the side of the handgrip 109 as the rear side.

The body 103 mainly includes a motor housing 105 that houses a driving motor 111, and a gear housing 107 that houses a motion converting mechanism 113 and a striking mechanism 115. The driving motor 111 is arranged such that its axis of rotation extends in a vertical direction (as viewed in FIG. 1) substantially perpendicular to the longitudinal direction of the body 103 (the axial direction of the hammer bit). The rotating output of the driving motor 111 is appropriately converted into linear motion via the motion converting mechanism 113 and transmitted to the striking mechanism 115. Then, an impact force is generated in the axial direction of the hammer bit 119 via the striking mechanism 115.

The motion converting mechanism 113 serves to convert rotation of the driving motor 111 into linear motion and transmit it to the striking element 115. The motion converting mechanism 113 is formed by a crank mechanism which includes a crank shaft 121 that is driven by the driving motor 111, a crank arm 123 and a piston 125. The piston 125 forms a driving element that drives the striking element 115 and can slide within a cylinder 131 in the axial direction of the hammer bit 119.

The striking element 115 mainly includes a striking element in the form of a striker 133 and an intermediate element in the form of an impact bolt 135. The striker 133 is slidably disposed within the bore of the cylinder 131 and linearly driven via the action of an air spring of an air chamber 131*a* of the cylinder 131 which is caused by sliding movement of the piston 125. The impact bolt 135 is slidably disposed within the tool holder 137 and serves to transmit the kinetic energy of the striker 133 to the hammer bit 119.

The handgrip 109 extends in a vertical direction (as viewed in FIG. 1) substantially perpendicular to the longitudinal direction of the body 103 (the axial direction of the hammer bit 119). The handgrip 109 includes a grip body 141 having a hollow inside in the form of a hollow part (internal space) 141*a*, and a grip cover 143 that covers a rear opening 141*b* (see FIG. 4) at the rear of the grip body 141. The grip cover 143 is fastened to the grip body 141 at several points by fastening means (not shown) such as screws. The rear opening 141*b* of the grip body 141 is provided for access to the hollow part 141*a* of the grip body 141 for parts assembling operation and extends almost the entire length of the grip body in the extending direction.

The handgrip 109 is generally U-shaped in side view. Specifically, the handgrip 109 has upper and lower connecting parts 145, 147 extending forward and generally horizontally from the upper and lower ends of the grip body 141 on the both ends of the handgrip in the extending direction (vertical direction), in order to connect the handgrip 109 to the body 103. The upper connecting part 145 is a feature that corresponds to the "connecting part" in this invention. The upper and lower connecting parts 145, 147 are integrally formed with the grip body 141.

As shown in FIGS. 2 and 3, the upper connecting part 145 is connected to an upper portion of the rear end of the gear housing 107 via a coil spring 151 which serves to absorb vibration of the handgrip 109 during operation. The coil spring 151 is a feature that corresponds to the "elastic element" in this invention. The coil spring 151 is arranged slightly above an extension of the axis of the hammer bit 119 (on the opposite side of the extension from a pivot 159 which is described below) and such that the direction of the spring force (the longitudinal direction) of the coil spring generally coincides with the direction of input of vibration, or the axial direction of the hammer bit 119. The coil spring 151 extends forward through an upper opening 149*a* formed on an upper end of the rear of a rear housing cover 149. One end (front end) of the coil spring is supported by a spring receiver 152 which is integrally formed with the gear housing 107, and the other end (rear end) is supported by a spring receiver 153 which is fixedly mounted on the upper connecting part 145.

A dust-proof expansion cover 154 is provided between the front end of the upper connecting part 145 and the rear surface of the rear housing cover 149 and covers the coil spring 151. Further, as shown in FIG. 3, a pair of right and left connecting members 155 extend forward with a predetermined length from the front surface of the upper connecting part 145 and are arranged symmetrically on the both sides of the coil spring 151. The right and left connecting members 155 are loosely fitted from the rear into bores of right and left cylindrical guides 156 formed in the rear housing cover 149, such that the connecting members are allowed to move with respect to the cylindrical guides 156 in the axial direction of the hammer bit 119 (in the longitudinal direction). Further, a screw 157 is inserted into each of the connecting members 155 from the front, and a head of the screw 157 is held in contact with a rear surface of the associated cylindrical guide 156 via a washer 158. Thus, the connecting member 155 is prevented from slipping out of the cylindrical guide 156. As a result, the upper connecting part 145 is connected to the rear housing cover 149 in such a manner as to be allowed to move in the longitudinal direction with respect to the rear housing cover 149.

As shown in FIG. 1, the lower connecting part 147 is pivotally supported by the pivot 159 which is provided on the rear end of a lower portion of the rear housing cover 149 and extends horizontally in the lateral direction. Thus, the handgrip 109 is connected to the body 103 in such a manner as to be allowed to rotate on the pivot 159 with respect to the body 103 in the axial direction of the hammer bit 119 (in the longitudinal direction). In the vibration-proof handgrip 109 constructed as described above, the vibration absorbing action of the coil spring 151 is effectively performed against vibration which is caused in the axial direction of the hammer bit 119 and transmitted from the body 103 to the handgrip 109 during operation.

The rear housing cover 149 is arranged to cover a rear region of the gear housing 107 including a rear part of its side, a lower part of the driving motor 111, and a rear region of the motor housing 105 including a rear part of its side. The rear housing cover 149 is fastened to the motor housing 105 and the gear housing 107 by fastening means (not shown) such as screws. Specifically, the rear housing cover 149 is provided as a component part which forms part of the body 103. A controller 165 for controlling the driving motor 111 is disposed at the rear of the motor housing 105 and housed in a space between the motor housing 105 and the rear housing cover 149. The controller 165 is a feature that corresponds to the "motor control unit" in this invention.

An electrical switch 161 for energizing the driving motor 111 is disposed within an upper region of the hollow part 141*a* of the grip body 141. As shown in FIG. 4, the electrical switch 161 can be actuated between an on position shown by solid line and an off position shown by two-dot chain line. The driving motor 111 is energized in the on position, while it is de-energized in the off position.

A slide member 163 to be slid by a user is disposed in the upper connecting part 145. The slide member 163 is a feature that corresponds to the "operating member" in this invention.

As shown in FIGS. 2 to 4, the slide member 163 is arranged substantially right behind the coil spring 151 and above the electrical switch 161 and slidably mounted extending through the inside of the connecting part 145 in a lateral direction or in a direction transverse to the axial direction of the hammer bit 119 and to the extending direction of the grip body 141.

As shown in FIGS. 3 and 4, a generally inverted V-shaped engagement part 163*c* which opens downward is formed on the underside of the slide member 163. A switch lever 161*a* of the electrical switch 161 is engaged in the V-shaped space of the engagement part 163*c*. One end of the slide member 163 in the sliding direction is designed as an ON operating region 163*a* which is operated to place the switch lever 161*a* of the electrical switch 161 in the on position, and the other end is designed as an OFF operating region 163*b* which is operated to place the switch lever 161*a* in the off position. The slide member 163 is slid to the on position when the user presses the ON operating region 163*a*, while it is slid to the off position when the user presses the OFF operating region 163*b*. The on position and the off position correspond to the "energizing position" and the "de-energizing position", respectively, in this invention.

The electrical switch 161 is electrically connected to an AC cord (an AC cord guard 167 is shown in FIG. 1) and the controller 165 via a wire (not shown), and the AC cord and the controller 165 are also electrically connected to each other via a wire (not shown). The AC cord is provided as a power cord for introducing AC power to the controller 165 and installed in the lower region of the handgrip 109. The electrical switch 161 is designed as a switch for switching between the on position in which the driving motor 111 is energized and the off position in which it is de-energized. The controller 165 is designed as a control part for controlling power feeding to the driving motor 111.

The electrical switch 161 disposed in the upper region of the grip body 141 is electrically connected to the AC cord disposed in the lower region of the grip body 141 by a wire installed in the hollow part 141*a* of the grip body 141. Further, as shown in FIG. 1, the lower connecting part 147 of the handgrip 109 has a hollow part 147*a* which is contiguous to the hollow part 141*a* of the grip body 141. A lower opening 149*b* is formed in an area of the rear housing cover 149 which is connected to the lower connecting part 147, and communicates with the hollow part 147*a* of the lower connecting part 147. The electrical switch 161 on the handgrip 109 side and the controller 165 on the body 103 side are connected by a wire which is installed via the hollow part 141*a* of the grip body 141, the hollow part 147*a* of the lower connecting part 147 and the lower opening 149*b* of the rear housing cover 149. Further, the AC cord on the handgrip 109 side and the controller 165 on the body 103 side are connected by a wire which is installed via the hollow part 147*a* of the lower connecting part 147 and the lower opening 149*b* of the rear housing cover 149. Thus, according to this embodiment, wires can be installed in a rational manner by utilizing the hollow part 141*a* of the grip body 141, the hollow part 147*a* of the lower connecting part 147 and the lower opening 149*b* of the rear housing cover 149.

As described above, in this embodiment, the handgrip 109 is configured such that the coil spring 151 is disposed between the upper connecting part 145 and the body 103 (the gear housing 107), and the lower connecting part 147 is connected to the body 103 in such a manner as to be rotatable on the pivot 159 with respect to the body 103 in the longitudinal direction, so that transmission of vibration from the body 103 to the handgrip 109 via the upper connecting part 145 can be reduced by the coil spring 151. Thus, the vibration-proof handgrip 109 can be realized. In this case, the lower connecting part 147 of the handgrip 109 is connected to the body 103 such that it can rotate on the pivot 159 with respect to the body 103 in the longitudinal direction which substantially coincides with the input direction of vibration. Therefore, in the handgrip 109 thus constructed, the vibration absorbing action of the coil spring 151 is effectively performed against vibration which is caused in the axial direction of the hammer bit 119 and transmitted from the body 103 to the handgrip 109.

Further, the coil spring 151 is arranged above an extension of the axis of the hammer bit 119 and remote from the pivot 159. Therefore, vibration absorption of the coil spring 151 is performed at a location in which the amplitude of vibration is large, so that vibration can be efficiently absorbed. Further, with the construction in which the handgrip 109 is connected to the body 103 via the pivot 159, advantageously, the handgrip 109 does not wobble with respect to the body 103 in any direction other than the direction of rotation on the pivot 159.

The slide member 163 which serves as a means for operating the electrical switch 161 is disposed in the upper connecting part 145. In order to perform a hammering operation by using the electric hammer 101, the user slides the slide member 163 by pressing the ON operating region 163*a* of the slide member 163, so that the switch lever 161*a* of the electrical switch 161 is switched to the on position and the driving motor 111 is driven. In this embodiment, the slide member 163 is configured to be retained in the position to which it is slid (for example, by frictional resistance of the sliding area) even if it is released after the pressing operation. Therefore, the slide member 163 does not have to be retained by the user's finger in the position to which it is slid. Thus, ease of operation can be enhanced in that the user can hold only the handgrip 109 and operate the electric hammer 101 to perform a hammering operation.

Thus, according to this embodiment, the coil spring 151 is disposed between the upper connecting part 145 of the handgrip 109 and the gear housing 107, and the slide member 163 for on-off operation of the electrical switch 161 is arranged right behind the coil spring 151. With this construction, the electric hammer 101 can be realized which has the vibration-proof handgrip 109 and provides increased ease of operation.

Further, in this embodiment, with the construction in which the electrical switch 161 is disposed within the hollow part 141*a* of the grip body 141, effective use can be made of the space of the hollow part 141*a*. Further, the electrical switch 161 can be protected against vibration by disposing it on the vibration-proof handgrip 109 side. Further, in the electric hammer 101, a unit for driving the hammer bit 119 is formed by the driving motor 111, the motion converting mechanism 113 and the striking mechanism 115 and produces heat when it is driven. As described above, however, the electrical switch 161 is disposed on the handgrip 109 side away from the source of heat generation. Therefore, the electrical switch 161 can be protected against an adverse effect which may be caused by the heat generation.

Further, in this embodiment, the lower connecting part 147 of the handgrip 109 is connected to the body 103 such that it can rotate on the pivot 159 with respect to the body 103 in the longitudinal direction. Such a connecting structure may be changed, for example, into a connecting structure using a ball joint which is formed by a ball and a concave spherical surface, or an elastic connecting structure having the same coil spring 151 as used for the upper connecting part 145, or an elastic rubber.

DESCRIPTION OF NUMERALS

101 electric hammer (hand-held power tool)
103 body (power tool body)
105 motor housing
107 gear housing
111 driving motor (motor)
113 motion converting mechanism
115 striking mechanism
119 hammer bit (tool bit)
121 crank shaft
123 crank arm
125 piston
131 cylinder
131*a* air chamber
133 striker
135 impact bolt
137 tool holder
141 grip body
141*a* hollow portion
141*b* opening
143 grip cover
145 upper connecting part
147 lower connecting part
147*a* hollow part
149 rear housing cover
149*a* upper opening
149*b* lower opening
151 coil spring (elastic element)
152 housing-side spring receiver
153 grip-side spring receiver
154 dust-proof expansion cover
155 connecting member
156 cylindrical guide
157 screw
158 washer
159 pivot
161 electrical switch
161*a* switch lever
163 slide member
163*a* ON operating region
163*b* OFF operating region
163*c* engagement part
165 controller
167 AC cord guard

I claim:

1. A hand-held power tool which performs a predetermined operation on a workpiece by a tool bit disposed in a tip end region of a power tool body and driven by a motor comprising:

a grip arranged on the proximal end of the power tool body from the tool bit, the grip extending in a direction transverse to an axis parallel to the tool bit, a connecting part that connects the grip to the power tool body at one end of the grip, an elastic element disposed between the connecting part and the power tool body, the elastic element reducing transmission of vibration from the power tool body to the grip, an electrical switch that switches the motor between an energized state and a de-energized state and an operating member with a substantially V-shaped portion, the operating member being configured to be switched by a user between an energizing position in which the electrical switch switches the motor to the energized state and a de-energizing position in which the electrical switch switches the motor to the de-energized state, the operating member being retained in the position to which it is switched, wherein:

the operating member is disposed in the connecting part in such a manner as to be slidable in a direction transverse to the axis parallel to the tool bit and an axis approximately parallel to the grip, the substantially V-shaped portion engages the electrical switch to move the electrical switch between the energized state and the de-energized state when the operating member is operated, the operating member is retained in the position to which the operating member is switched without external force being applied, and the electrical switch is located in the grip and rearward of the elastic element.

2. The power tool as defined in claim 1, wherein the grip is hollow and the electrical switch is disposed in a hollow part of the grip.

3. The power tool as defined in claim 1, wherein the grip is connected to the power tool body at the other end side in the extending direction of the grip in such a manner as to be rotatable on a pivot with respect to the power tool body in the longitudinal direction of the power tool body.

4. The power tool as defined in claim 3, wherein a motor control unit is disposed on the power tool body side, and the electrical switch and the motor control unit are connected by a wire running to the power tool body side through the grip at the other end side in the extending direction of the grip.

5. The power tool as defined in claim 1, wherein the operating member is retained in the position to which the operating member is switched by frictional resistance.

6. The power tool as defined in claim 1, wherein the direction transverse to the longitudinal direction of the power tool body is approximately perpendicular to the longitudinal direction of the power tool body and to the extending direction of the grip.

7. The power tool as defined in claim 1, wherein the operating member is disposed in the connecting part in such a manner as to be linearly slidable in the direction transverse to the longitudinal direction of the power tool body and to the extending direction of the grip.

8. The power tool as defined in claim 1, wherein the electrical switch is the only switch configured to be actuated by a user to switch the motor to the energized state or the de-energized state.

* * * * *